United States Patent
Wang et al.

(10) Patent No.: US 6,955,548 B1
(45) Date of Patent: Oct. 18, 2005

(54) ELECTRONIC CARD CONNECTOR

(75) Inventors: Eric Wang, Taipei Hsien (TW); Kieth Chang, Taipei Hsien (TW); Ming-Chung Wang, Taipei Hsien (TW)

(73) Assignee: Advanced Connection Technology Inc., Taipei Hsien (TW)

(*) Notice: Subject to any disclaimer, the term of this patent is extended or adjusted under 35 U.S.C. 154(b) by 0 days.

(21) Appl. No.: 10/999,710

(22) Filed: Nov. 30, 2004

(51) Int. Cl.[7] .............................................. H01R 13/62
(52) U.S. Cl. ....................................................... 439/159
(58) Field of Search ............................... 439/157, 159, 439/59, 629; 235/441, 492

(56) References Cited

U.S. PATENT DOCUMENTS

| | | | |
|---|---|---|---|
| 6,572,392 B2 * | 6/2003 | Motojima | 439/159 |
| 6,652,299 B2 * | 11/2003 | Sato | 439/159 |
| 6,669,493 B2 * | 12/2003 | Kuroda | 439/159 |
| 6,729,894 B2 * | 5/2004 | Ooya et al. | 439/159 |
| 6,817,874 B2 * | 11/2004 | Okabe | 439/157 |
| 6,821,136 B2 * | 11/2004 | Lai | 439/159 |
| 6,835,077 B2 * | 12/2004 | Ikeda et al. | 439/159 |

* cited by examiner

*Primary Examiner*—Khiem Nguyen
(74) *Attorney, Agent, or Firm*—Darby & Darby

(57) ABSTRACT

An electronic card connector includes a slider operable between a card-inserting mode and a card-releasing mode, and a positioning mechanism. The positioning mechanism includes a positioning member, a biasing element, and a second engaging element. The positioning member has a first sliding face, a second sliding face cooperating therewith to define a first corner with the first sliding face, and a first engaging element. In the card-inserting mode, operation of the slider results in relative movement between the second engaging element and the positioning member along a first path such that the second engaging element abuts against and slides along the first sliding face by the urging action of the biasing element, and turns around the first corner to engage releasably the first engaging element.

15 Claims, 8 Drawing Sheets

ELECTRONIC CARD CONNECTOR

BACKGROUND OF THE INVENTION

1. Field of the Invention

The invention relates to a connector, more particularly to a connector in use for an electronic card.

2. Description of the Related Art

A conventional electronic card connector, as shown in FIG. 1, includes a one-way track 14 formed in a base of a housing. The one-way track 14 includes a forwarding portion 141, a positioning portion 142 and a returning portion 143 to form a loop, which allows a downward bending head 321 of a guide lever 32 to perform one-way movement therein. Adjacent to and surrounded by the one-way track 14 is a positioning block 144. The positioning block 144 has a first side surface, a second side surface and a third side surface contoured with the forwarding portion 141, the positioning portion 142, and the returning portion 143, respectively. The first side surface of the positioning block 144 extends along the forwarding portion 141 and terminates at one end of the second side surface, which is contoured to form a recess 145, such that, when the downward bending head 321 passes beyond the end of the forwarding portion 141, the bending head 321 will turn into and rest in the recess 145. The third side surface of the positioning block 144 has a first part parallel to the first side surface, and a second part bent to merge with the first side surface. The card connector further includes a spring 30 and a slide member 31. One end of the spring 30 is connected to the base, while the other end of the spring 30 is connected to the slide member 31. Movement of the slide member 31 is actuated by insertion or ejection of an electronic card into or from the housing. Further, the end of guide lever 32 is connected to the slide member 31 so as to be driven thereby. Therefore, when the electronic card is pushed and is inserted into the housing, the bending head 321 is pushed to move towards the end of the forwarding portion 141. After reaching the end of the forwarding portion 141, by the force of the spring 30, the bending head 321 is withdrawn to move into the positioning portion 142. The recessed structure of the positioning portion 142 then hooks the bending head 321 in the recess 145. In this way, the electronic card is properly positioned in the connector. By pushing the electronic card forward relative to the connector once more, the bending head 321 is pushed away from the recess 145 towards the returning portion 143. By virtue of a restoring force from the spring 30, the bending head 321 is moved along the returning portion 143, thereby generating an ejecting force for the electronic card. The electronic card can thus be ejected from the connector.

The conventional card connector is disadvantageous in that formation of the one-way track 14 is rather complicated, causing inconvenience during manufacture and assembly of the electronic card connector.

SUMMARY OF THE INVENTION

The object of the present invention is to provide an electronic card connector that can overcome the above drawback associated with the prior art.

Accordingly, an electronic card connector of the present invention comprises a card-mounting base, a slider, an urging member, and a positioning mechanism.

The slider is mounted slidably on the base and is operable between a card-inserting mode and a card-releasing mode.

The urging member restores the slider to a normal position.

The positioning mechanism includes a positioning member having a first engaging element, a biasing element, and a second engaging element.

The positioning member has a first sliding face, and a second sliding face extending from the first sliding face and cooperating with the first sliding face to define a first corner therebetween. The first engaging element is disposed at the second sliding face.

The positioning mechanism is associated with the slider in such a manner that operation of the slider in the card-inserting mode results in relative movement between the second engaging element and the positioning member along a first path such that the second engaging element abuts against the first sliding face by virtue of the urging action of the biasing element, slides along the first sliding face, and turns around the first corner to come into contact with the second sliding face so as to engage releasably the first engaging element.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
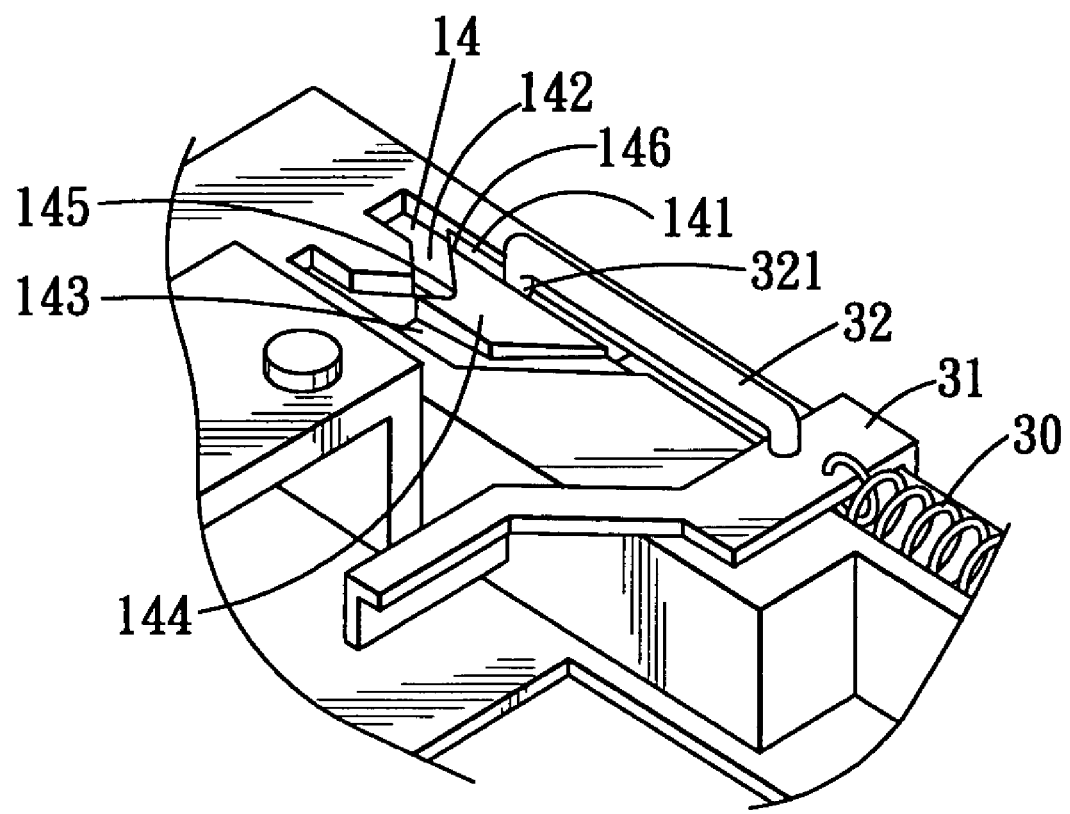
FIG. 1 is a fragmentary enlarged perspective view of a conventional electronic card connector.

Before the present invention is described in greater detail with reference to the accompanying preferred embodiments, it should be noted herein that like elements are denoted by the same reference numerals throughout the disclosure.

Figure 2:
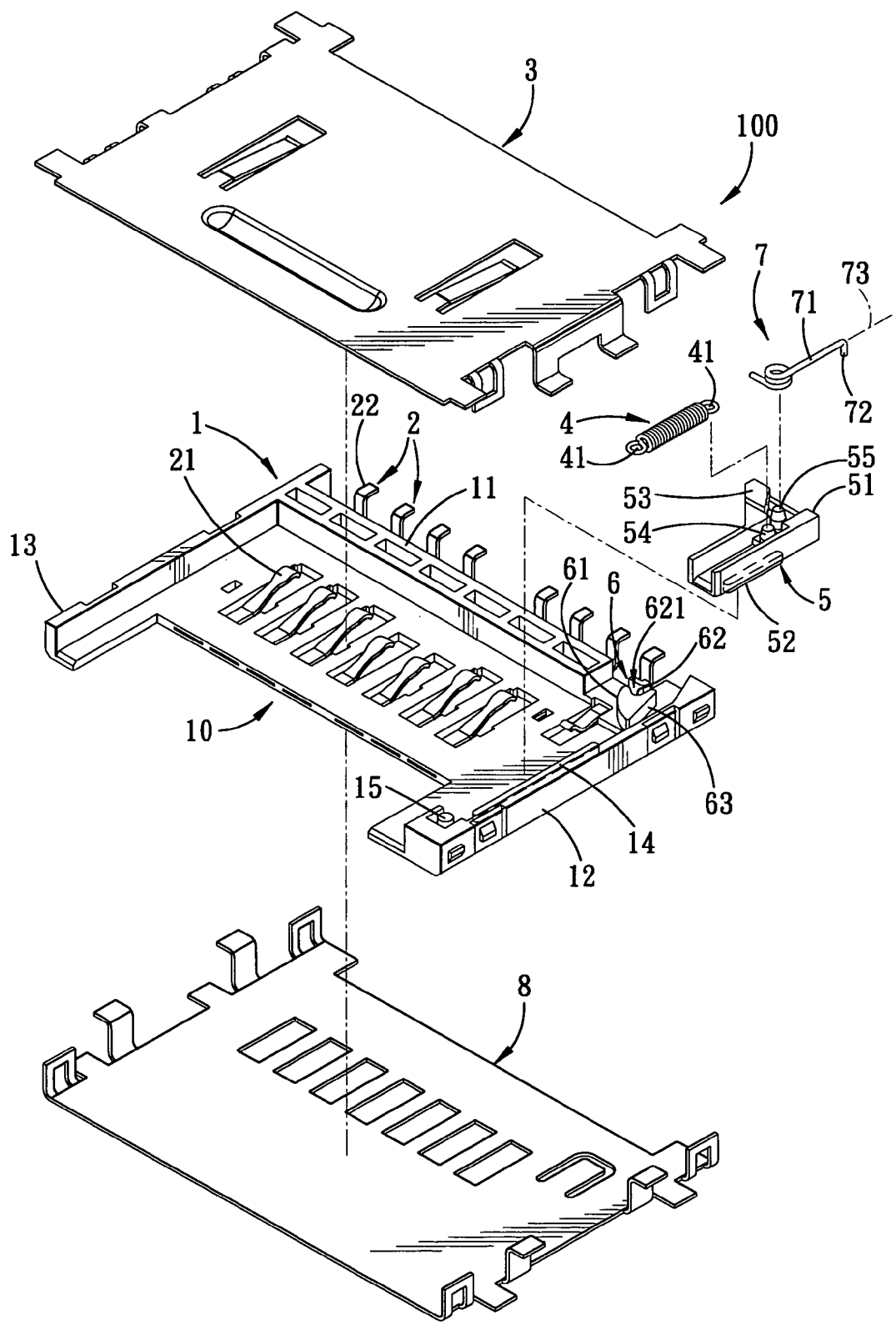
FIG. 2 is an exploded perspective view of the first preferred embodiment of an electronic card connector according to the present invention.
Figure 3:
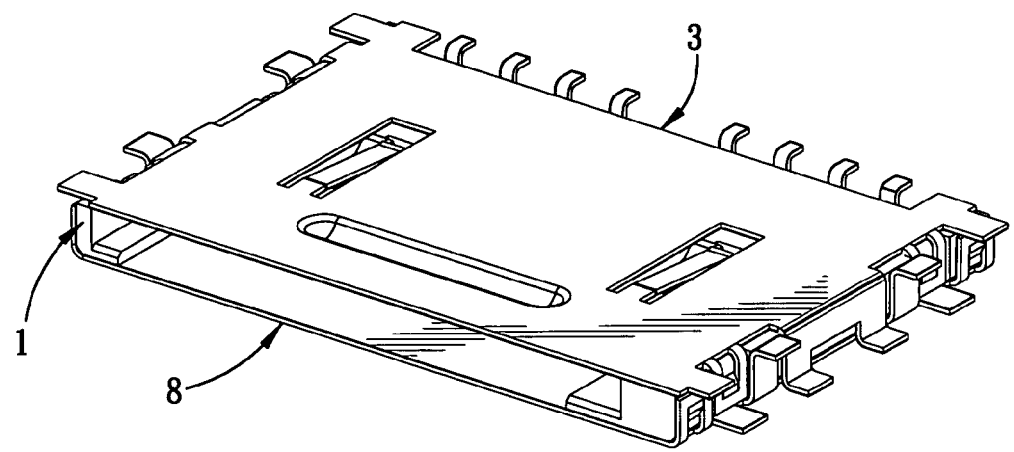
FIG. 3 is an assembled perspective view of the first preferred embodiment.

As shown in FIGS. 2 and 3, a first preferred embodiment of an electronic card connector 100 according to the present invention includes a card-mounting base 1, a slider 5, an urging member 4 and a positioning mechanism.

The card-mounting base 1 includes a main part 11 and first and second lateral walls 12, 13 extending transversely and respectively from two sides of the main part 11. The main part 11 and the first and second lateral walls 12, 13 cooperate to define a card-receiving space 10 to receive the electronic card (not shown), which, in this embodiment, is a secure digital (SD) memory card. The electronic card connector 100 further comprises a set of terminals 2 mounted on the card-mounting base 1. Each of the terminals 2 has a contact section 21 on a top side of the main part 11 so as to make electrical contact with the electronic card, and a connecting section 22 extending from the contact section 21 and disposed at a front side of the main part 11 so as to make electrical contact with a circuit board (not shown herein). The main part 11 of the card-mounting base 1 is formed with an elongated guiding groove 14 proximate to and parallel to the first lateral wall 12. The main part 11 further has a stud 15 extending transversely from the top side thereof proximate to a rear end of the guiding groove 14.

The electronic card connector 100 further includes a first metal shielding member 3 that covers a top of the card-mounting base 1 so as to shield off electromagnetic interference.

In this embodiment, the urging member 4 includes a compression spring connected to the card-mounting base 1 and having two opposite ring-shaped ends 41.

Figure 4:
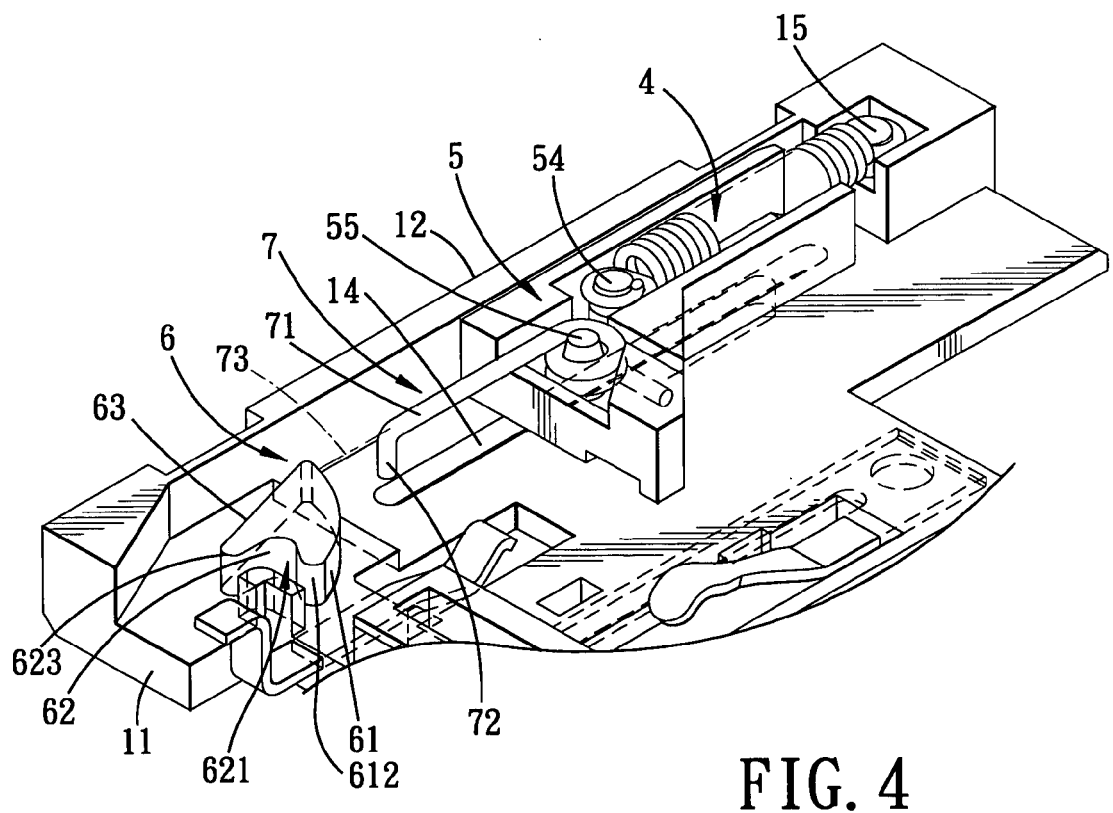
FIG. 4 is a fragmentary perspective view of the first preferred embodiment for illustrating the relative positioning of a positioning mechanism and an urging member.

The slider 5 includes a slide block 51, a protrusion 52 protruding from a bottom side of the slide block 51 into the guiding groove 14 such that the slider 5 is mounted slidably on the base 1 and is operable between a card-inserting mode and a card-releasing mode, and a card contact part 53 that extends from the slide block 51. The slider 5 further includes a pair of studs 54, 55 extending transversely from a top side of the slide block 51. The ring-shaped ends 41 of the urging member 4 are fixedly mounted on the studs 54, 55 respectively such that the urging member 4 serves restore the slider 5 to a normal position (see FIG. 4).

The positioning mechanism includes a positioning member 6, a biasing element 7, and a second engaging element 72.

The positioning member 6 is mounted on the main part 11 in front of a front side of the guiding groove 14, and has a first sliding face 61, a second sliding face 62 extending from the first sliding face 61 and cooperating with the first sliding face 61 to define a first corner 612 therebetween, a third sliding face that extends from the second sliding face 62 and that cooperates with the second sliding face 62 to define a second corner 623 therebetween, and a first engaging element 621 disposed at the second sliding face 62. In this embodiment, the second sliding face 62 of the positioning member 6 is formed with an engaging groove that defines the first engaging element 621. The first, second and third sliding faces 61, 62, 63 are curved and cooperate to form a heart-shaped contour.

In this embodiment, the biasing element 7 includes a torsion spring that has a coil portion sleeved on the stud 55 of the slider 5, and an arm portion 71 extending from the coil portion and having a free end. The second engaging element 72 extends transversely from the free end of the arm portion 71. The arm portion 71 defines an axis 73, and the first sliding face 61 is disposed in a manner to extend across the axis 73. The free end of the arm portion 71 is operable to bend toward a direction transverse to the axis so as to build up a restoring force.

In this embodiment, preferably, the electronic card connector 100 further includes a second metal shielding member 8 that covers a bottom side of the card-mounting base 1 and that engages the first metal shielding member 3 by mechanical means to encapsulate the exterior of the card-mounting base 1 so as to shield off electromagnetic interference.

Figure 5:
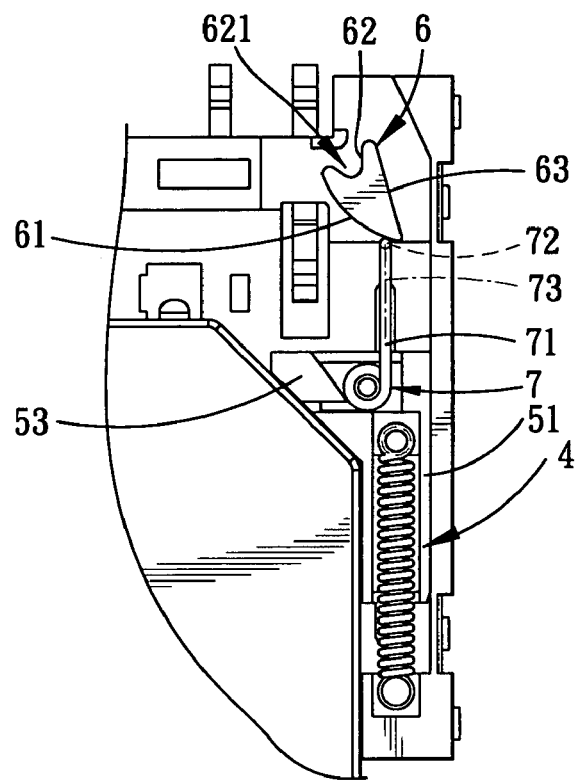
FIG. 5 is a fragmentary schematic top view of the first preferred embodiment for illustrating how an electronic card is inserted therein and drives a second engaging element of the positioning mechanism to abut against a first sliding face of a positioning member of the positioning mechanism.
Figure 6:
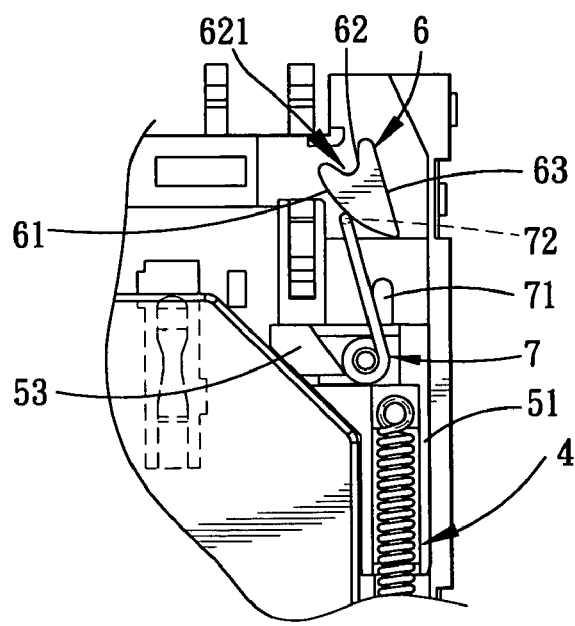
FIG. 6 is a fragmentary schematic top view of the first preferred embodiment for illustrating how the electronic card drives the second engaging element of the positioning mechanism to slide along the first sliding face of the positioning member.
Figure 7:
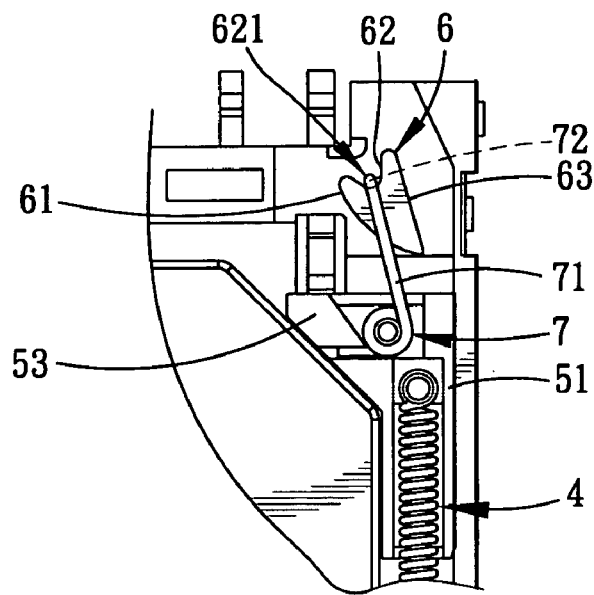
FIG. 7 is a fragmentary schematic top view of the first preferred embodiment for illustrating how the electronic card drives the second engaging element to turn around a first turning point between the first sliding face and a second sliding face of the positioning member so as to engage a first engaging element of the positioning member.

In operation, the positioning mechanism is associated with the slider 5 in such a manner that operation of the slider 5 in the card-inserting mode results in relative movement between the second engaging element 72 and the positioning member 6 along a first path such that the second engaging element 72 abuts against the first sliding face 61 by virtue of the urging action of the biasing element 7 as shown in FIG. 5, slides along and builds up an urging force against the first sliding face 61 as shown in FIG. 6, turns around the first corner 612 by the built-up urging force of the biasing element 7 to come into contact with the second sliding face 62 by virtue of the biasing force of the urging member 4, and engage releasably the first engaging element 621 when the electronic card stop to insert, as shown in FIG. 7. In this manner, the electronic card is securely positioned inside the electronic card connector 100.

Figure 8:
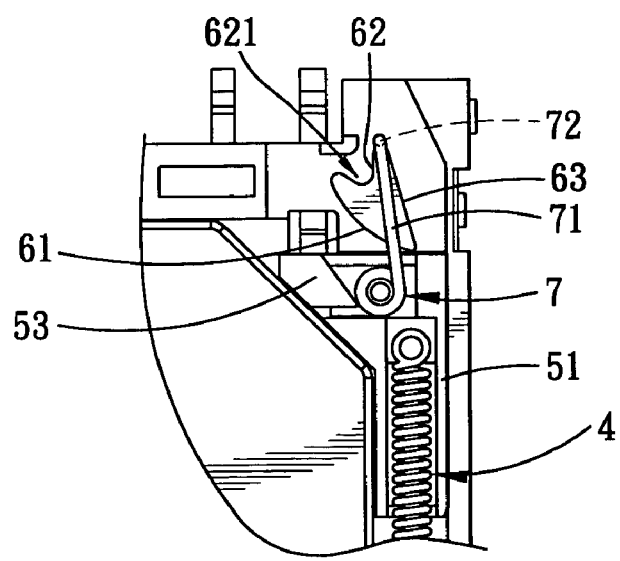
FIG. 8 is a fragmentary schematic top view of the first preferred embodiment for illustrating how the electronic card drives the second engaging element to turn around a second turning point between the second sliding face and a third sliding face of the positioning member so as to disengage from the first engaging element of the positioning member.

When the electronic card is pushed further, as shown in FIG. 8, operation of the slider 5 in the card-releasing mode is triggered, and results in relative movement between the second engaging element 72 and the positioning member 6 along a second path such that the second engaging element 72 disengages from the first engaging element 621, abuts against the second sliding face 62 by virtue of the urging action of the biasing element 7, slides along the second sliding face 62, and turns around the second corner 623 to come into contact with the third sliding face 63, thereby permitting the slider 5 to be restored to the normal position and to drive the electronic card via the contact part 53 as shown in FIG. 5 by virtue of the urging action of the urging member 4, thereby ejecting the electronic card.

Figure 9:
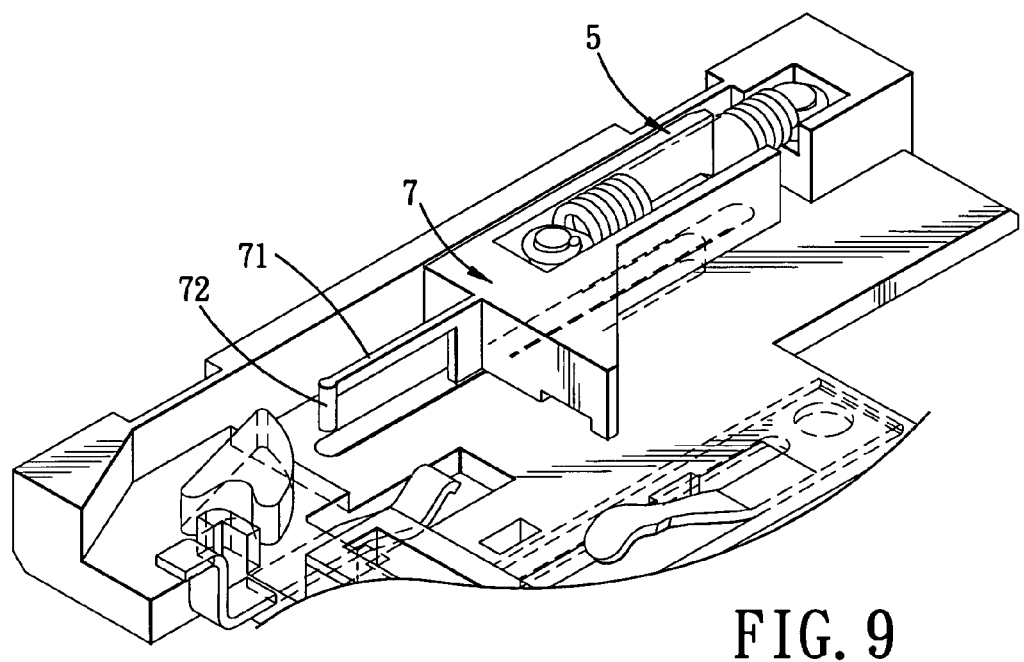
FIG. 9 is a fragmentary perspective view of the second preferred embodiment.

FIG. 9 illustrates the second preferred embodiment of the electronic card connector 100 of this invention, which differs from the previous preferred embodiment in that the biasing element and the slider are integrally formed, and are made from nylon or plastic-steel, which are more robust and can provide an excellent resilience force, such that the torsion spring of the biasing element 7 may be dispensed with.

Figure 10:
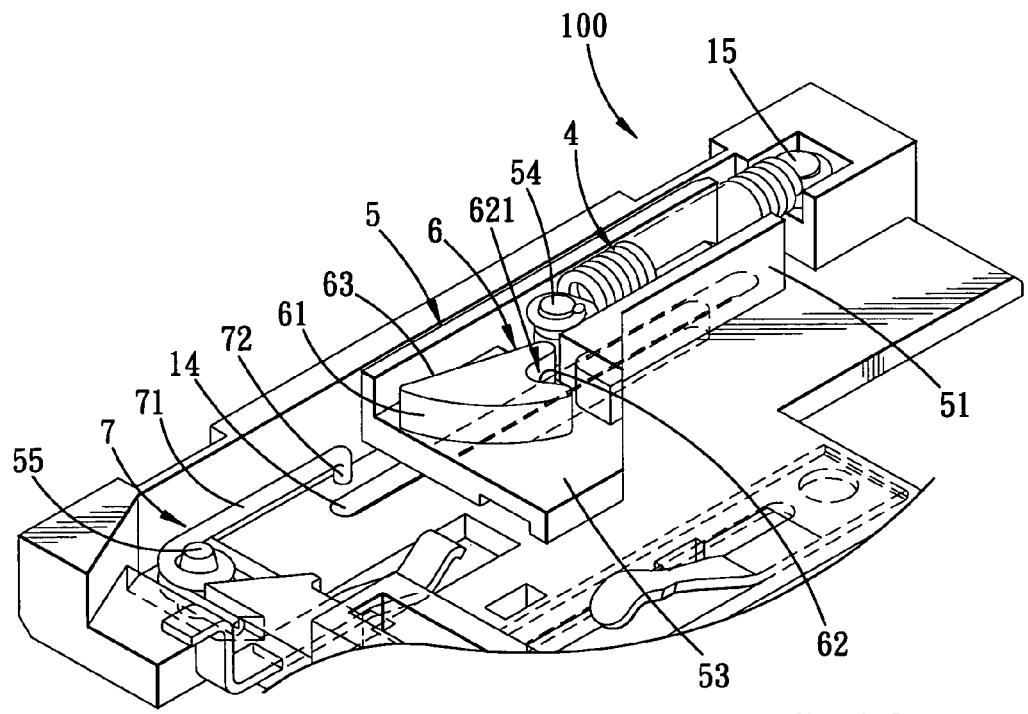
FIG. 10 is a fragmentary perspective view of the third preferred embodiment of an electronic card connector according to the present invention.
Figure 11:
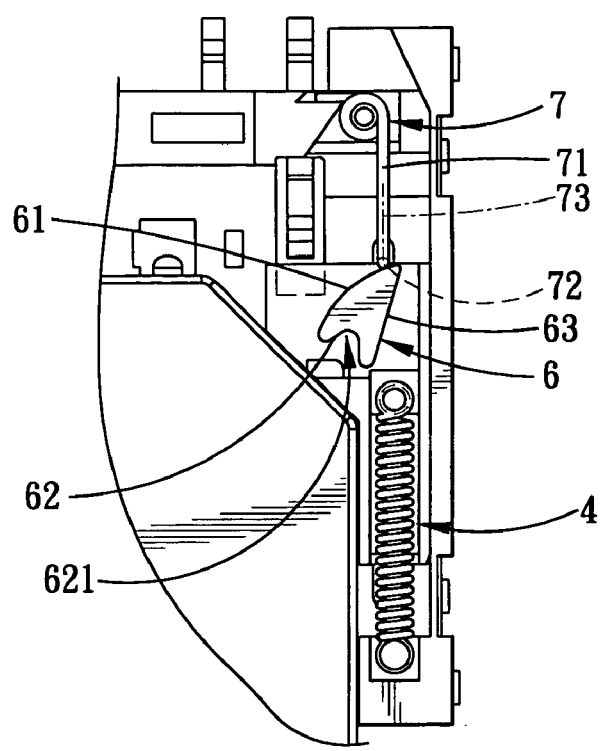
FIG. 11 is a fragmentary schematic top view of the third preferred embodiment for illustrating how an electronic card is inserted therein and drives a second engaging element of the positioning mechanism to abut against a first sliding face of a positioning member of the positioning mechanism.
Figure 12:
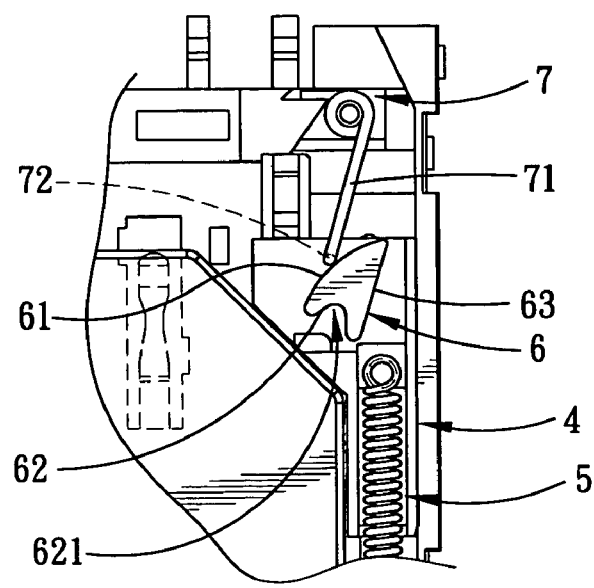
FIG. 12 is a fragmentary schematic top view of the third preferred embodiment for illustrating how the electronic card drives the second engaging element of the positioning mechanism to slide along the first sliding face of the positioning member.
Figure 13:
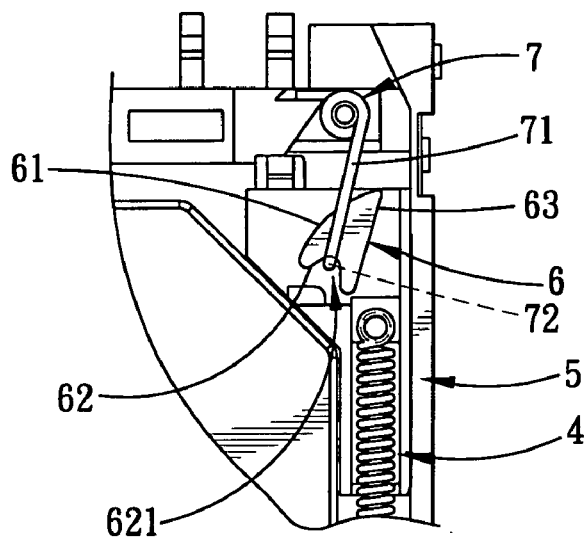
FIG. 13 is a fragmentary schematic top view of the third preferred embodiment for illustrating how the electronic card drives the second engaging element to turn around a first turning point between the first sliding face and a second sliding face of the positioning member so as to engage a first engaging element of the positioning member.
Figure 14:
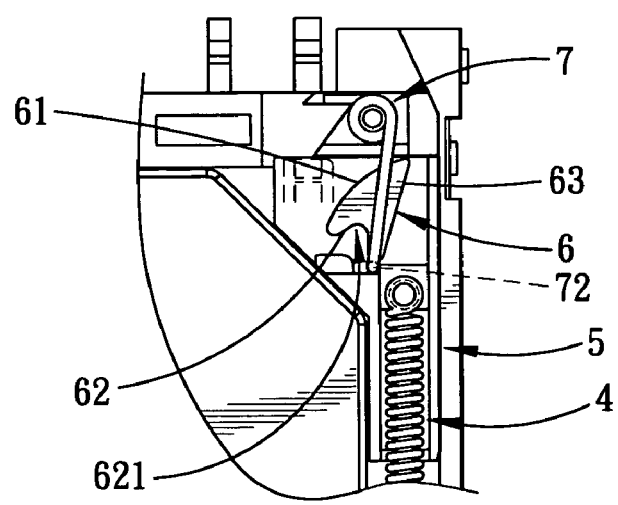
FIG. 14 is a fragmentary schematic top view of the third preferred embodiment for illustrating how the electronic card drives the second engaging element to turn around a second turning point between the second sliding face and a third sliding face of the positioning member so as to disengage from the first engaging element of the positioning member.

FIG. 10 illustrates the third preferred embodiment of the electronic card connector 100 of this invention, which differs from the first preferred embodiment in that, instead of having the positioning member 6 mounted securely on the card-mounting base 1, and the biasing element 7 mounted on the slider 5, the third preferred embodiment has the biasing element 7 mounted on the card-mounting base 1, and the positioning member 6 mounted securely on the slider 5.

The operation of the third preferred embodiment is the same as that of the first preferred embodiment, as shown in FIGS. 11, 12, 13 and 14, which correspond respectively to FIGS. 5, 6, 7 and 8.

From the foregoing, this invention provides new and convenient type of card inserting and releasing operations for an electronic card connector, and has a more robust and simpler structure, which can reduce manufacturing and assembly costs.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An electronic card connector comprising:
   a card-mounting base;
   a slider mounted slidably on said base and operable between a card-inserting mode and a card-releasing mode;
   an urging member for restoring said slider to a normal position; and
   a positioning mechanism including
      a positioning member that has a first sliding face, a second sliding face extending from said first sliding face and cooperating with said first sliding face to define a first corner therebetween, and a first engaging element disposed at said second sliding face,
      a biasing element, and
      a second engaging element;
   wherein said positioning mechanism is associated with said slider in such a manner that operation of said slider in said card-inserting mode results in relative movement between said second engaging element and said positioning member along a first path such that said second engaging element abuts against said first sliding face by virtue of the urging action of said biasing element, slides along said first sliding face, and turns around said first corner to come into contact with said second sliding face so as to engage releasably said first engaging element.

2. The electronic card connector as claimed in claim 1, wherein said positioning member further has a third sliding face that extends from said second sliding face and that cooperates with said second sliding face to define a second corner therebetween; and
   wherein operation of said slider in said card-releasing mode results in relative movement between said second engaging element and said positioning member along a second path such that said second engaging element disengages from said first engaging element, abuts against said second sliding face by virtue of the urging action of said biasing element, slides along said second sliding face, and turns around said second corner to come into contact with said third sliding face, thereby permitting said slider to be restored to said normal position by virtue of the urging action of said urging member.

3. The electronic card connector as claimed in claim 2, wherein said first, second and third sliding faces are curved and cooperate to form a heart-shaped contour.

4. The electronic card connector as claimed in claim 3, wherein said biasing element includes a torsion spring that has an arm portion with a free end, said second engaging element extending transversely from said free end of said arm portion.

5. The electronic card connector as claimed in claim 1, wherein said card-mounting base has a main part formed with an elongated guiding groove, said slider having a slide block, a protrusion protruding from said slide block into said guiding groove, and a card contact part that extends from said slide block.

6. The electronic card connector as claimed in claim 1, wherein said urging member includes a compression spring connected to said card-mounting base and said slider.

7. The electronic card connector as claimed in claim 1, further comprising a set of terminals mounted on said card-mounting base.

8. The electronic card connector as claimed in claim 1, further comprising a first metal shielding member that covers said card-mounting base.

9. The electronic card connector as claimed in claim 8, further comprising a second metal shielding member that covers a bottom side of said card-mounting base and that engages said first metal shielding member.

10. The electronic card connector as claimed in claim 1, wherein said biasing element is made of plastic-steel.

11. The electronic card connector as claimed in claim 1, wherein said biasing element is made of nylon.

12. The electronic card connector as claimed in claim 1, wherein said positioning member is mounted securely on said card-mounting base, and said biasing element is mounted on said slider.

13. The electronic card connector as claimed in claim 1, wherein said biasing element is mounted on said card-mounting base, and said positioning member is mounted securely on said slider.

14. The electronic card connector as claimed in claim 1, wherein said positioning member is formed with an engaging groove that defines said first engaging element.

15. The electronic card connector as claimed in claim 1, wherein said arm portion defines an axis, said first sliding face extending across said axis.

* * * * *